United States Patent [19]

Panush

[11] Patent Number: 4,753,829
[45] Date of Patent: Jun. 28, 1988

[54] OPALESCENT AUTOMOTIVE PAINT COMPOSITIONS CONTAINING MICROTITANIUM DIOXIDE PIGMENT

[75] Inventor: Sol Panush, Farmington Hills, Mich.

[73] Assignee: BASF Corporation, Clifton, N.J.

[21] Appl. No.: 932,741

[22] Filed: Nov. 19, 1986

[51] Int. Cl.$^4$ .................. B05D 3/02; B32B 5/16; C08K 3/22; C09D 5/29

[52] U.S. Cl. ................... 427/385.5; 427/388.2; 427/409; 428/328; 428/469; 523/171; 523/210; 524/497; 524/409; 524/423; 524/433; 524/493

[58] Field of Search ............ 523/171, 210; 524/409, 524/441, 413, 497; 427/385.5, 388.2, 409; 428/328, 469

[56] References Cited

U.S. PATENT DOCUMENTS

| | | | |
|---|---|---|---|
| 2,287,053 | 10/1938 | Murphy | 523/171 |
| 2,874,140 | 1/1959 | Kloepfer . | |
| 3,041,303 | 6/1962 | Nelson | 524/441 |
| 3,137,672 | 6/1964 | Lehane, Jr. . | |
| 3,499,799 | 3/1970 | Mays et al. . | |
| 3,647,741 | 3/1972 | Hutchinson . | |
| 3,708,318 | 1/1973 | Reinhart et al. | 524/441 |
| 3,718,584 | 2/1973 | Beste et al. . | |
| 3,843,571 | 10/1974 | Fitzgerald | 523/171 |
| 4,017,448 | 4/1977 | Panush | 524/88 |
| 4,073,764 | 2/1978 | Hemmerich et al. . | |
| 4,180,609 | 12/1979 | Varsition | 524/409 |
| 4,328,042 | 5/1982 | Ostertg et al. | 427/213 |
| 4,373,963 | 2/1983 | Uenishi et al. | 423/600 |
| 4,499,143 | 2/1985 | Panush | 428/336 |
| 4,539,258 | 9/1985 | Panush | 428/324 |
| 4,551,491 | 11/1985 | Panush | 524/31 |
| 4,594,211 | 6/1986 | Nornhaupt | 523/171 |
| 4,598,020 | 7/1986 | Panush | 428/411.1 |
| 4,605,687 | 8/1986 | Panush | 523/171 |

FOREIGN PATENT DOCUMENTS

| | | | |
|---|---|---|---|
| 1187638 | 5/1985 | Canada | 524/413 |
| 111385 | 6/1984 | European Pat. Off. | 524/409 |
| 54-069067 | 6/1979 | Japan . | |
| 138048 | 10/1979 | Japan | 524/441 |
| 45753 | 3/1980 | Japan | 523/171 |
| 58-057453 | 4/1983 | Japan . | |
| 152944 | 8/1984 | Japan | 524/409 |
| 59-176366A | 10/1984 | Japan . | |

OTHER PUBLICATIONS

Metallic/Non-Metallic Concept for New Effect-High Chroma-Durable Colors, S. Panush, Journal of Paint Technology, vol. 45: No. 581; pp. 39-43.

The Physics and Chemistry of Color-The Fifteen Causes of Color, Kurt Nassau, pp. 161, 162, 163, 164, 165, 166, 167, 168, 232, 233, 234, 236, 310.

Preparation of Transparent Ultrafine-Particle Titanium Oxide, Ito et al., Journal of the Japan Society of Color Materials, 57 (6), 305-308, 1984.

Primary Examiner—John C. Bleutge
Assistant Examiner—David W. Woodward
Attorney, Agent, or Firm—Emil Richard Skula

[57] ABSTRACT

Automotive coating compositions are disclosed. The compositions comprise a metallic or a metallic-like pigment and a metal oxide pigment, wherein the metal oxide pigment has a particle size of about 20 nm to about 30 nm. The coating compositions exhibit high chromaticity with excellent downflop. The coating compositions also have an opalescent appearance.

22 Claims, No Drawings

OPALESCENT AUTOMOTIVE PAINT COMPOSITIONS CONTAINING MICROTITANIUM DIOXIDE PIGMENT

DESCRIPTION

1. Technical Field

The field of art to which this invention pertains is coating compositions, coating methods and the resultant coated articles.

2. Background Art

Automotive coating compositions exhibiting a metallic appearance are well known in the coatings art. The metallic appearance can be produced by using a metallic or metallic-like pigment such as metal flake in the coating composition. A metallic appearance can also be produced by the inclusion of metallic-like pigments such as metal oxide coated mica pigment in the coating composition, as disclosed in U.S. Pat. No. 4,499,143, U.S. Pat. No. 4,605,687, and U.S. Pat. No. 4,598,015 which are incorporated by reference.

Multicoat coating compositions comprising a pigmented base coat and at least one clear top coat are well known in the art as described in U.S. Pat. No. 3,375,227. The use of a base coat-clear topcoat multicoat coating system results in improved aesthetic appearance along with improved resistance to weathering and damage.

Existing multicoat coating systems having a pigmented base coat comprising metallic or metallic-like pigments with a clear, outer topcoat have several aesthetic deficiencies. First of all, metal flake pigments such as aluminum flake have a natural graying effect which affects the subsequent color of pigmented coatings containing these metal flakes. The chromaticity or pure color of color pigments is partially negated by the graying effect. This graying effect must be somehow eliminated or compensated for to produce the desired color effects. Typically, this is accomplished by increasing the color pigment loading in the coating. Secondly, deep, dark downflop is a desirable characteristic of certain metallic paint compositions. Downflop refers to a phenomenon associated with metallic effect coatings wherein the color varies with the angle of viewing. When viewing such a coating directly, the metallic pigment or metallic-like pigment predominates. When viewing the coating from an angle the colored pigment predominates. In existing metallic or metallic-like pigment-containing automotive coating compositions, the downflop or metallic-like effect is partially negated due to the presence of opaque color pigments. It is known that the addition of a critical amount of opaque color pigment in relation to the metallic or metallic-like pigment will produce an optimum of chromaticity, however, the metallic effect or downflop is adversely affected. It is not presently possible to have high chromaticity with excellent downflop.

It is also desirable to have coating compositions which when applied to a substrate and dried or cured have an opalescent color appearance. It is known to produce an opalescent effect with a three layer coating comprising first, an inner basecoat or primer coating having an N-4 to N-8 value on the Munsell color chart, a second interference or intermediary coating containing metal oxide encapsulated mica particles in a pigment to binder ratio of 0.06 to 0.13, and a third clear outer topcoat. These opalescent coating systems are disclosed in U.S. Pat. No. 4,539,258 and U.S. Pat. No. 4,615,940 which are incorporated by reference. However, there are disadvantages with this type of opalescent coating in that it requires three layers which interact to produce the opalescent effect. The application of three separate paint layers makes the coating process more complex and introduces additional variables which have to be controlled.

Accordingly, what is needed in this art are simplified coating compositions containing metallic or metallic-like pigments having high chromaticity with excellent downflop and exhibiting opalescence.

DISCLOSURE OF INVENTION

A coating composition is disclosed comprising about 24.0 wt. % to about 35.0 wt. % of a thermoplastic or thermosetting resin, about 1.1 wt. % to about 10.5 wt. % of transparent metal oxide pigment having a particle size of about 20 nm to about 30 nm, and about 1.1 wt. % to about 10.5 wt. % of a metallic or metallic-like pigment. The weight percentages are weight percent based upon the total weight of the solids. The composition when applied to a substrate exhibits high chromaticity with excellent downflop. The composition also exhibits opalescence.

Yet another aspect of the present invention is a multicoat coating composition comprising at least one layer of a pigmented basecoat and at least one layer of an outer clear film forming polymer topcoat wherein the pigmented basecoat comprises the above-mentioned coating composition.

Another aspect of the present invention includes a method of coating a substrate by depositing the above-described coating composition as a basecoat and optionally, the above-described clear topcoat.

Another aspect of the present invention includes a substrate coated with at least one layer of the above-described coating composition as a basecoat and at least one outer layer of the above-described clear topcoat.

Another aspect of the present invention is a resinous coating comprising about 1.1 wt. % to about 10.5 wt. % of transparent metal oxide pigment having a particle size of about 20 nm to about 30 nm and about 1.1 wt. % to about 10.5 wt. % of a metallic or metallic-like pigment.

The compositions of the present invention, surprisingly and unexpectedly, have opalescence without the need for an interference coat. The coating compositions have high chromaticity with excellent downflop, which is similarly surprising and unexpected.

The foregoing and other features and advantages of the present invention will become more apparent from the following description.

BEST MODE FOR CARRYING OUT THE INVENTION

While any substrate material can be coated with the coating compositions according to the present invention, including such things as glass, ceramics, paper, wood, and even plastic material depending on the specific drying and/or curing requirements of the particular composition, the coating system of the present invention is particularly adapted for metal substrates, and specifically as an automotive paint finish system. The substrate may also be bare substrate material or can be conventionally primed, for example to impart corrosion resistance. Exemplary metal substrates include such things as steel, aluminum, copper, magnesium, alloys thereof, etc. The components of the compositions can be varied to suit the temperature tolerance of the substrate material. For example, the components can be so constituted for air drying (i.e., ambient, low temperature cure (e.g., 150° F.–180° F.), or high temperature cure, e.g., over 180° F.).

The coating compositions of the present invention can be used as either pigmented topcoats or as the basecoat of pigmented basecoat/clear topcoat multicoat coating compositions. It is preferred to use the coatings of the present invention as a pigmented basecoat overcoated by a clear outer topcoat. Although the pigmented basecoat/clear topcoat multicoat coating is preferred, it will be appreciated that the coatings described herein can have utility as pigmented topcoats, and, pigmented coatings in general.

The base coat material, i.e., the pigmented polymer layer closest to the substrate, comprises any suitable film-forming materal conventionally used in this art including acrylics, alkyds, polyurethanes, polyesters and aminoplast resins. The base coat can be deposited out of an aqueous carrier, or out of conventional volatile organic solvents such as aliphatic, cycloaliphatic and aromatic hydrocarbons, esters, ethers, ketones and alcohols including such things as toluene, xylene, butyl acetate, acetone, methyl isobutyl ketone, butyl alcohol, etc. When using volatile organic solvents, although it is not required, it is preferred to include a conventional rheology control agent such as about 2% to about 50% by weight of a cellulose ester and/or wax (e.g., polyethylene) which facilitates quick release of the volatile organic solvent resulting in improved flow or leveling out of the coating. The cellulose esters used must be compatible with the particular resin systems selected and include such things as cellulose nitrate, cellulose propionate, cellulose butyrate, cellulose acetate butyrate, cellulose acetate propionate and mixtures thereof. The cellulose esters when used are preferably used in about 5% to about 20% by weight based on film forming solids.

Other types of rheology control agents conventional in this art include microparticles or microgels. These microgels or microparticles comprise polymer particles in a dispersed state. Typically, about 2 wt. % to about 20 wt. % of solid vehicle of a microparticle dispersion is added to the basecoat formulation. Microparticle or microgel dispersions, also known as nonaqueous dispersions, useful as rheology control agents in the basecoats of the present invention are disclosed in U.S. Pat. Nos. 3,365,414, 4,290,932, 4,377,661, 4,414,357, 4,447,536 which are incorporated by reference.

The acrylic resins in the base coat may be either thermoplastic (acrylic lacquer systems) or thermosetting. Acrylic lacquers such as are described in U.S. Pat. No. 2,860,110 are one type of film forming composition useful according to this invention in the base coat. The acrylic lacquer compositions typically include homopolymers of methyl methacrylate and copolymers of methyl methacrylate which contain among others, acrylic acid, methacrylic acid, alkyl esters of acrylic acid, alkyl esters of methacrylic acid, vinly acetate, acrylonitrile, styrene and the like.

When the relative viscosity of the acrylic lacquer polymer is less than about 1.05, the resulting films have poor solvent resistance, durability and mechanical properties. On the other hand, when the relative viscosity is increased above the 1.40 level, paints made from these resins are difficult to spray and have high coalescing temperatures.

Another type of film-forming material useful in forming the base coat of this invention is a combination of a cross-linking agent and a carboxy-hydroxy acrylic copolymer. Monomers that can be copolymerized in the carboxy-hydroxy acrylic copolymer include esters of acrylic and methacrylic acid with alkanols containing 1 to 12 carbon atoms, such as ethyl acrylate, methyl methacrylate, butyl acrylate, butyl methacrylate, 2-ethylhexyl acrylate, lauryl methacrylate benzyl acrylate, cyclohexyl methacrylate, and the like. Additional monomers are acrylonitrile, methacrylonitrile, styrene, vinyl toluene, alpha-methyl styrene, vinyl acetate, and so forth. These monomers contain one polymerizable ethylenically unsaturated group and are devoid of hydroxyl and carboxylic groups.

The cross-linking agents used in combination with the hydroxy-carboxy copolymers are those compositions which are reactive with hydroxy and/or carboxylic acid groups. Examples of such cross-linking agents are polyisocyanates (typically di- and/or tri- isocyanates) polyepoxides and aminoplast resins. Particularly preferred cross-linking agents are the aminoplast resins.

The polyisocyanates when reacted with hydroxyl bearing polyester or polyether or acrylic polymers will yield urethane films useful in the process of this invention in both the base coat and top coat. The isocyanate (-NCO) hydroxyl (-OH) reaction takes place readily at room temperature, so that ambient and low temperature cure is possible.

Among other base coats which are typicaly used in the processes of the present invention are those commonly known as alkyd resins which are defined to include fatty acid or oil containing esterification products. The methods for preparing these resins are well known in the art.

The preferred alkyd resins useful in this invention are those containing from about 5 to about 65 weight percent of a fatty acid or oil and having a hydroxyl equivalent to carboxy equivalent ratio of from about 1.05 to 1.75. Alkyd resins having less than about 5% fatty compound are classified as the "oil-less" alkyd resins or polyester resins described hereinafter. On the other hand, alkyd resins containing greater than 65% of a fatty compound exhibit poor baking properties, poor chemical resistance and unsatisfactory adhesion to either the base coat or the substrate. When the hydroxyl to carboxyl equivalent ratio is less than about 1.05 gelation can result during polymer preparation while resins prepared having a ratio in excess of 1.75 have low molecular weights and therefore poor chemical resistance.

These alkyd resins can also be used as the topcoat of this invention. When this is the case it is preferred that the oil or fatty acid portion of the alkyd resin contain a light colored baking oil or fatty acid such as coconut or dehydrated castor oils or fatty acis. Furthermore, when these resins are used as topcoats they can be reacted with various acrylic ethylenically unsaturated monomers as described above to produce vinyl modified alkyd resins.

Curing of these alkyd resins can be accomplished by blending with any of the previously described cross-linking agents in the same weight ratios as are used with carboxy-hydroxy copolymers.

Included among the various fatty acids and oils useful in preparing these alkyd resins are the fatty acids derived from the following oils; castor, dehydrated castor, coconut, corn, cottonseed, linseed, oticica, perilla, poppyseed, safflower, soybean, tung oil, etc. and the various rosins containing tall oil fatty acids. Useful polyols include the various glycols, such as ethylene glycol, propylene glycol, neopentyl glycol, butylene glycol, 1,4 butanediol, hexylene glycol, 1,6 hexanediol, the polyglycols such as diethylene glycol or triethylene glycol, etc.; the triols such as glycerine, trimethylol ethane, trimethylol propane, etc., and other higher functional alcohols such as pentaerythritol, sorbitol, mannitol, and the like. Acids useful in preparing the alkyd resins of this invention include mono-functional acids such as rosin acids, benzoic acid, para tertiary butyl benzoic acid and the like; the polyfunctional acids such as adipic acid, azelaic acid, sebacic acid, phthalic acid or anhydride, isophthalic acid, terephthalic acid, dimerized and polymerized fatty acids, trimellitic acid, and the like.

Yet another useful base coat is prepared using nonaqueous dispersions which are widely known in this art. Typically, these dispersions are prepared by polymerizing a monomer such as methyl methacrylate in the presence of a solvent in which polymers derived from the above monomer are insoluble and a precursor which is soluble in the solvent. Nonaqueous dispersions can have a relative solution viscosity as previously defined of about 1.05 to 3.0. Dispersions having a relative solution viscosity in excess of about 3.0 are difficult to spray and have high coalescence temperatures while dispersions with a relative solution viscosity less than about 1.05 have poor resistance, durablity and mechanical properties. The monomers useful in preparing the above dispersed copolymers or homopolymers include those conventional in this art such as those listed previously as useful in forming the carboxy-hydroxy acrylic copolymers. Nonaqueous dispersion vehicles are disclosed in U.S. Pat. Nos. 3,607,821, 3,717,605, 3,514,500 and 3,686,114, the disclosures of which are incorporated by reference.

In another instance the base coat film can be produced from resins known as polyesters or "oil-less" alkyd resins. These resins are prepared by condensing nonfatty containing polyols and polyacids. Included among the useful polyacids are isophthalic acid, phthalic acid or anhydride, terephthalic acid, maleic acid or anhydride, fumaric acid, oxalic acid, sebacic acid, azelaic acid, adipic acid, etc. Mono basic acids such as benzoic, para tertiary butyl benzoic and the like can also be utilized. Among the polyalcohols are the diols or glycols such as propylene glycol, ethylene glycol, butylene glycol, 1,4 butanediol, neopentyl glycol, hexalene glycol, 1,6-exanediol, and the like; the triols such as trimethylol ethane, trimethylol propane and glycerine and various other higher functional alcohols such as pentaerythritol.

Any of the above-recited polymers may be used as the topcoat, as long as it provides a transparent film. The term "transparent film" is defined as a film through which the base coat can be seen. It is preferred that the transparent film be substantally colorless so that the full polychromatic and aesthetic effect of the base coat is not substantially decreased. However, in some instances, desirable and unique styling effects can be obtained by the addition of contrast or complementary colors to the topcoat. Another outstanding feature of the topcoat is the significant improvement in the durability which is provided to the overall coating composition.

It is preferred to utilize the compositions of the present invention in a pigmented basecoat clear topcoat multicoat coating system which offers a means of combining the desirable properties of a combination of resin systems. For example, in automotive finishes the pigment control properties of acrylic lacquers can be combined with the chemical resistance properties of thermosetting acrylic resins by applying a thermosetting acrylic clear coat over a pigmented thermoplastic acrylic lacquer base coat (although acrylic lacquers may be used for both layers). Likewise, in appliance finishes the chemical resistance of polyester resins can be combined with the lower cost of thermosetting acrylic resins by applying a polyester clear topcoat over a pigmented thermosetting acrylic base coat. Although any of the above-mentioned thermoplastic materials may be used to form the transparent topcoat, better durablity is achieved if the topcoat is one of the above-cited thermosetting materials, i.e., the material containing the cross-linking agents.

Even though it is preferred to use the coating compositions of the present invention as a pigmented basecoat coating overcoated with a clear topcoat coating, these compositions may be also used as pigmented topcoats and will still exhibit high chromaticity with excellent downflop and opalescence. Any of the previously mentioned polymer systems for basecoats or clear topcoats may be used to form pigmented topcoats of the present invention.

The metal oxide pigments useful in the compositions of the present invention will typically have a particle size of about 10 nm to about 45 nm, more typically about 15 nm to about 35 nm and preferably about 20 nm to about 30 nm. The metal oxide pigment will have a transparency typically about 6 to about 9, more typically about 4 to about 9, and preferably about 8 to about 9-10. The UV absorptivity of the metal oxide pigment compositions will typically be about 2 to about 7, more typically about 5 and preferably about 6.

The metal oxide pigments useful in the practice of the present invention include titanium dioxide, antimony oxide, magnesium oxide, micro barium sulfate, amorphous silica and other metal oxide pigments known in the art having the previously mentioned size, transparency, and UV absorptivity parameters. Although predictably any of the afore-mentioned metal oxide pigments may be used, it is preferred to use titanium dioxide pigment in order to have coatings which have optimum opalescence as well as optimum chromaticity with optimum downflop. It is particularly preferred to use commercially available titanium dioxide pigments such as MT100S Rutile titanium dioxide and MT500B Rutile titanium dioxide available from Dainichiseika Color and Chemicals America, Inc. located in Clifton, N.J. Similar titanium dioxide pigments are available from Teikoku Kako Co. Ltd. located in Osaka, Japan.

The titanium dioxide pigments useful in the practice of the present invention can be prepared in a number of ways known in the art such as the colloid chemical technique, the chemical condensation method and hydrolosis of an alkoxide. It is known in particular to use a colloid chemical technique. Titanium hydroxide is precipitated in a solution of titanyl sulfate by adding a sodium carbonate solution. Then, the titanium hydroxide is peptized by hydrochloric acid to coagulate a transparent positively charged hydrosol of hydrous titanium oxide. A solution of sodium dodecylbenzene sulfonate, an anionic surfactant, is added to the hydrosal to make the colloid particles lypophilic. The particles are transformed into an organosol by flushing into an organic solvent. Hydrous titanium dioxide powder is then obtained by driving off the organic solvent. The powder is converted into an ultrafine powder by heating at a temperature below the decomposition temperature of dodecylbenzene sulfonate. Pigment modification is sometimes desirable, e.g. with aluminum laurate or aluminum stearate.

Commercially available metal oxide pigments other than titanium dioxide having the requisite parameters for use in the coatings and processes of the present invention include magnesium oxide manufactured by Whittaker, Clark & Daniels located in Willowbrook, Illinois, antimony oxide manufactured by Horshaw located in Cleveland Ohio, amorphous silica manufactured by DeGussa Corporation, located in Teterboro, New Jersey and micro barium sulfate manufactured by Sachtleben, located in Whitefield, Manchester, U.K.

The metallic pigments useful in the practice of the present invention include conventional metallic pigments such as metal flake, metal coated particles, and the like. It is particularly preferred to use commercially available aluminum flake pigments in the form of pigment pastes such as SS5242AR manufactured by Silberline, OBP8187 manufactured by Obron, and 720AR manufactured by U.S. Bronze. In addition to aluminum flake, other metal flake compositions may be used such as bronze flake, stainless steel flake, and the like; silver flake, and other precious metal flakes.

The metallic-like pigments useful in the present invention may comprise metal oxide coated mica particles. The metal oxides used as coatings can comprise titanium dioxide, ferric oxide, chromium hydroxide, methacrylatochromium chloride, and the like and combinations thereof. Commercially available metal oxide coated mica pigments include 9-504 manufactured by E.M. Chemicals and MEARL Exterior Russet manufactured by Mearl Corporation.

The coating compositions of the present invention may contain conventional pigments typically used in coating compositions such as carbon black, perylene red, transparent red and yellow iron oxide, phthalocyanine blue, phthalocyanine green, anthrapyrimidine yellow, quinacridone red, carbazole dioxidine, indanthrene blue, and flavanthrone yellow. These pigments are widely known and are readily commercially available.

The coating compositions of the present invention when used as automotive paint coatings or other coatings will comprise sufficient quantities of the following components in amounts conventional in this art.

It will be appreciated by one skilled in the art that the amounts of each component will vary with the desired color effect of the dried or cured coating as well as the type of coating.

The pigmented coating compositions of the present invention will typically comprise about 24 wt. % to about 37 wt. % of resin vehicle.

The amount of solvent in the coating compositions will typically comprise about 10 wt. % to about 30 wt. %.

The amount of metal flake pigment optionally contained in the coating compositions of the present invention will typically comprise about 1.10 wt. % to about 11.50 wt. %.

The amount of metallic-like pigment, such as coated mica, optionally contained in the coating compositions of the present invention will typically comprise about 1.10 wt. % to about 11.50 wt. %.

The amount of cellulose acetate butyrate rheology control agent optionally present in the coatings of the present invention typically comprises about 2 wt. % to about 20 wt. %.

The amount of microgel rheology control agents optionally present in the coatings of the present invention typically comprises about 2 wt. % to about 20 wt. %.

If the resin system is a thermosetting system, typically about 20 wt. % to about 35 wt. % of total solids of a crosslinking agent is added to the coating compositions.

The pigmented coating compositions of the present invention are manufactured by methods conventional in the art using equipment conventional in the art. A typical one thousand pound batch of a coating useful as an automotive original equipment manufacturer paint would be manufactured in the following manner. The following components would be added in a conventional order to a conventional mixing vessel equipped with a conventional mixing means:

154 pounds of microgel rheology control agent, 110 pounds of n-butyl acetate, 158.6 pounds monomeric melamine crosslinking agent, 233.73 pounds polyurethane resin, 37.0 pounds of microtitanium dioxide, 71.7 pounds of Silberline aluminum paste pigment and 235.97 pounds of monobutyl acetate. The components would be mixed for a sufficient amount of time using a sufficient amount of energy input via the mixing means to produce a homogeneously dispersed coating composition. It should be noted that it is preferred to add the micro metal oxide pigment as a pigment paste rather than as a dry pigment to improve the rate of dispersability of the pigment in the coating and to produce a homogeneous dispersion in the coating. A pigment paste will typically comprise 20–40 parts of micro metal oxide, about 40–60 pounds of an appropriate resin and about 20 parts of a solvent compatible with the resin. The pigment to binder ratio of the pigment paste will typically range from about 0.67/1 to about 1.5/1 and will be dependent upon the particular vehicle. If the particular pigment vehicle has good pigment wetting characteristics, the P/B ratio will be greater than 1/1. If the pigment wetting is not as good of a pigment wetter, then the P/B ratio will be less than 1/1. It should be noted that it is conventional in this art to add small amounts of acids to initiate crosslinking when the coating is baked. The acids are those known in the art such as paratoluene sulfonic acid. The acids are present in amounts known in the art, typically about 0.5–1.5 wt. % on the solid vehicle. It is also conventional in the art to add small quantities of UV absorbers to improve the ability of the cured films to withstand the detrimental effects of exposure to UV radiation over time. Typically about 0.25 to about 1.0 wt. % on the solid vehicle of a conventional, known UV absorber would be added, such as Ceiba Geigy, Tinuvin 328 ®, a substituted hydroxy phenol benzotriazoles, manufactured by Ceiba Geigy Corporation, Greens Boro, North Carolina.

The basecoat and the clear topcoats of the present invention can be applied to a substrate by any conventional method in this art such as brushing, spraying, dipping, flow coating, etc. Typically, spray application is used, especially for automotive coatings. Various types of spraying can be utilized such as compressed air spraying, electrostatic spraying, hot spraying techniques, airless spraying techniques etc. These application techniques can be performed manually or by using specially designed automated application machines such as robotic systems. Prior to application of the coating materials of the present invention in automotive applications or when dealing with ferrous substrates, a conventional corrosion-resistant primer is typically applied to the substrate. To this primed substrate is applied the base coat. The primer coatings which can be used to coat substrates prior to the application of the coatings of the present invention include cured cathodic electrocoat primers known in the art such as cross-linked amine-epoxy resin adducts such as those disclosed in U.S. Pat. Nos. 4,575,224 and 4,575,523 which are incorporated by reference. Other types of conventional primers include epoxies, acrylics, alkyds, polyurethanes, and polyesters applied by conventional methods such as spraying, brushing and the like. The applied primer coating is typically about 0.5 mil to about 1.0 mil thick. The basecoat is typically applied to a thickness of about from about 0.4 mil to about 2.0 mils and preferably about 0.5 mil to about 0.8 mil. The basecoat thickness can be produced in a single coating pass or a plurality of passes with very brief drying ("flash") between applications of coats.

Once the base coat has been applied, the transparent overcoat is applied after allowing the base coat to flash at ambient temperatures for about 30 seconds to about 10 minutes, preferably about 1 to about 3 minutes. While the base coat can be dried for longer periods of time, even at higher temperatures, a much improved product is produced by application of the transparent topcoat after only a brief flash. Some drying out of the base coat is necessary to prevent total mixing of the base coat and topcoat. However, a minimal degree of base coat-topcoat interaction is desirable for improved bonding of the coatings. The topcoat is applied thicker than the base coat (preferably about 1.8 to 2.3 mils) and can also be applied in a single or multiple pass.

It is critical that pigment control is retained in the base coat while it is being overcoated to produce the optimal esthetic effect. This is evidenced by lack of "strike-in" or migration of the two films (the base coat and topcoat) into each other. When "strike-in" occurs, pigments move from the base coat into the topcoat, the film compositions become intermixed at the interface and the baked coating composition has a dusty appearance rather than a clear "depth" appearance. Pigment control or "strike-in" prevention is prevented in the present invention by monitoring the process and by the inclusion of additives in the basecoat coating composition conventional in this art such as cellulose acetate butyrate, microgels, and high molecular weight monomers. However, sufficient wetting takes place at the interface so that no problems of delamination and solvent release from either coating are obtained.

Once the topcoat is applied, the system is again flashed for 30 second to 10 minutes and the total coatings are then baked at temperatures sufficient to drive off all of the solvent in the case of thermoplastic layers and at temperatures sufficient to cure and cross-link in the case of thermosetting layers. These temperatures can range anywhere from ambient temperature to about 400° F. Typically in the case of thermosetting materal temperatures of about 225° F. (e.g., 250° F.) are used, (e.g., for about 30 minutes).

It will be appreciated by those skilled in the art that the coatings of the present inventions will be applied in manners conventional in the particular coating art employed such as printing, non-automotive coating applications, container coating and the like. Coating thicknesses and curing or drying mechanisms will similarly vary with the coating art.

The metal oxide-containing coatings of the present invention exhibit, surprisingly and unexpectedly, an opalescent appearance as well as high chromaticity with excellent downflop. It is not known why the metal oxide pigments should interact with metallic or metallic-like pigments to produce these effects. It is believed that the fine pigment size of the metal oxide pigment combined with its transparency results in a unique scattering of the incident and reflected light which interacts with light reflected from the metallic or metallic-like pigments and the opaque color pigments to surprisingly and unexpectedly produce the chromaticity, downflop and opalescenses of the coatings of the present invention.

The following examples are illustrative of the principles and practice of this invention although not limited thereto. Parts and percentages where used are parts and percentages by weight.

EXAMPLE 1

A base coat paint coating composition was prepared by mixing the following components in a conventional mixing vessel using a conventional mixing means.

1.48 parts of micro titanium dioxide pigment having a particle size of about 20 nm, manufactured by Dainichiseika Colors and Chemical, Clifton, New Jersey. The microtitanium dioxide was added as a pigment paste to assure proper pigment wetting and dispersion. The paste was prepared by grinding the pigment with about 50.0 parts of a polyester polyurethane resin in a sand grinder to 10 or less microns.

7.17 parts of SS3141ST aluminum flake pigment paste (62% NV) manufactured by Silberline located in Tamaqua, Pennsylvania.

28.85 parts of polyester polyurethane resin.

31.24 parts of N-butylacetate solvent.

15.86 parts of a monomeric melamine resin, RU0578, manufactured by American Cyanamid Co., Wayne, New Jersey.

15.40 parts of rheology control agent comprising a microgel nonaqueous dispersion.

The pigment to binder ratio of the paint composition was 0.16. The ratio of microtitanium dioxide pigment to metal flake pigment was 1:3. The percent nonvolatiles was 43%. The components were mixed for about 10 minutes until a homogeneous mixture was obtained. The homogeneity of the mixture was tested by the following conventional test procedures: measurement of percent non-volatiles, weight per gallon, cure (hardness) by a Sward tester (surface) and through cure using a Tukon tester. Color was measured to a standard using visual test or a spectrophotometer.

EXAMPLE 2

Bonderized steel panels primed with a cured, corrosion resistant primer coating comprising polyester resin were sprayed with the basecoat composition of Example 1 to a film thickness of 0.6 mil on a dry film basis. After a flash of approximately 2 minutes at room temperature an additional 0.6 mil film of the base coat paint composition again as measured on a dry film basis was aplied by spraying. After a 60 second flash at room temperature, a transparent top coating was applied by spraying in two coats to a film thickness on a dry basis of about 2.0+0.02 mil. The transparent topcoating composition was prepared by blending 24.83 parts of polyurethane resin manufactured at 18.00 parts nonvolatile with 18.00 parts of 100 percent nonvolatile solution of butylated methylol melamine. After air drying for 15-30 minutes between 60° F.-100° F. and about 40% to 90% relative humidity, the coating was baked (cured) at 120° C. for 30 minutes. The resulting pigmented basecoat/clear topcoat system coating exhibited high chromaticity with excellent deepflop or metallic effect while also exhibiting opalescence.

Chromaticity was determined by the visual evaluation of a skilled observer of the purity of the color with reference to a Munsell color standard. The purity or chromaticity was related to the Munsell reference by the perception of various degrees of contamination with white or black tones.

Deepflop was again determined by visual observation of a skilled observer. The angle of viewing of the coated surface of the test panels was varied from 0° through 180° with reference to the eye of the observer. Color changes were recorded.

EXAMPLES 3-9

Basecoat coating compositions were made in accordance with Example 1, except that the coatings comprised the following pigmentation:
  micro titanium dioxide pigment having a particle size of about 20 nm
  BP1300 carbon black pigment manufactured by Cabot Corporation, Boston, Massachusetts
  SS5242AR aluminum pigment paste manufactured by Silverline, Tomaqua, Pennsylvania
  R6436 perylene red pigment manufactured by Mobay Chemical Corporation, Pittsburg, Pennsylvania The amount of each pigment in each coating was varied as listed (by parts) in Table I. The coatings were coated onto steel panels in accordance with the procedure of Example 2. The opalescent color appearance at various angles of viewing referred to as "Face", "Flash", and "Flop" (terms conventional in the art) was observed and is recorded in Table I. Face is defined as the viewed object being perpendicular to the eye. Flop is defined as the viewed object approaching a parallel plane to the eye. Flash is defined as that angle between face and flop where the undertone color is highlighted. The coatings of Examples 3-9 are characterized as being in the gray color area. The coatings exhibited opalescence along with high chromaticity and excellent downflop.

EXAMPLES 10-11

Coatings were made in accordance with Examples 3-9 except that transparent red iron oxide pigment (L-2185) manufactured by BASF Corporation, Wyandotte, Michigan was substituted for the perylene red pigment. The amount of each pigment in each coating and the opalescent color appearance results are presented in Table II. The coatings exhibited high chromaticity and excellent downflop as well as opalescence.

Although this invention has been shown and described with respect to detailed embodiments thereof, it will be understood by those skilled in the art that various changes in form and detail thereof may be made without departing from the spirit and scope of this claimed invention.

TABLE II

| GOLD COLOR AREA | EXAMPLE 10 | EXAMPLE 11 |
| --- | --- | --- |
| MICRO TITANIUM DIOXIDE | 61.33 | 55.61 |
| CARBON BLACK | — | 2.15 |
| ALUMINUM PASTE | 32.89 | 29.83 |
| TRANSP. RED IRON OXIDE RED PIGMENT | 5.78 | 12.41 |
|  | 100.00 | 100.00 |
| FACE | Lt. Gold Met. | Med-Dk. Gold Met. |
| FLASH | Lt. Gold Met. | Med. Gold Met. |
| FLOP | Gray Non-Met. | Med. Gold Ceramic |

I claim:

1. An exterior, automotive coating composition comprising
  about 24.0 wt. % to about 35.0 wt. % of a thermoplastic or thermosetting resin;
  about 1.1 wt. % to about 10.5 wt. % of transparent titanium dioxide pigment having a particle size of about 10 nm to about 45 nm and,
  about 1.1 wt. % to about 10.5 wt. % of a metallic or a metallic-like pigment,
  the composition when applied to a substrate having high chromaticity with excellent downflop, and, opalescence.

TABLE I

| GRAY COLOR AREA | EXAMPLE 3 | EXAMPLE 4 | EXAMPLE 5 | EXAMPLE 6 | EXAMPLE 7 | EXAMPLE 8 | EXAMPLE 9 |
| --- | --- | --- | --- | --- | --- | --- | --- |
| MICRO TITANIUM DIOXIDE | 63.44 | 59.56 | 55.91 | 64.82 | 63.03 | 58.60 | 54.46 |
| CARBON BLACK | 2.53 | 8.56 | 14.01 |  | 2.43 | 8.44 | 13.65 |
| ALUMINUM PASTE | 34.03 | 31.18 | 30.08 | 34.78 | 33.74 | 31.36 | 29.29 |
| PERYLENE RED PIGMENT |  |  |  | .40 | .80 | 1.60 | 2.60 |
|  | 100.00 | 100.00 | 100.00 | 100.00 | 100.00 | 100.00 | 100.00 |
| FACE | Lt. Gray Met. | Med. Gray Met. | Med-Dk. Gray Met. | Silver Met. | Lt. Beige Met. | Med. Yellow Gray Met. | Brown Met. |
| FLASH | Lt. Gray Met. | Med. Gray Met. | Med. Yellow Gray Met. | Silver Met. | Lt. Yellow Gray Met. | Med. Yellow Gray Met. | Brown Met. |
| FLOP | Blue Gray Ceramic | Med. Blue Gray Met. | Med-Dk. Blue Gray Met. | Lt. Lilac Ceramic | Med. Blue Gray Ceramic | Med. Gunmetal Met. | Dk. Blue Gray Met. |

2. The coating composition of claim 1 additionally comprising up to about 70.0 wt. % of at least one color pigment on a dry weight basis of the total pigment.

3. The coating composition of claim 1 wherein the transparent metal oxide pigment has a particle size of about 20 nm to about 30 nm.

4. The coating composition of claim 1 wherein the metallic pigment comprises metal flake.

5. The coating composition of claim 1 wherein the metallic-like pigment comprises metal oxide coated mica.

6. A substrate coated with at least one layer of a pigmented exterior, automotive base coat coating composition and at least one layer of an outer exterior, automotive clear topcoat composition wherein the basecoat coating comprises
   about 24.0 wt. % to about 35.0 wt. % of a thermoplastic or thermosetting resin;
   about 1.1 wt. % to about 10.5 wt. % of a transparent titanium dioxide pigment having a particle size of about 10 nm to about 45 nm and,
   about 1.1 wt. % to about 10.5 wt. % of a metallic or metallic-like pigment,
   the coating having high chromaticity with excellent downflop, and, opalescence, 7. The coated substrate of claim 6 wherein the base coat coating composition additionally comprises up to about 70.0 wt. % of at least one color pigment on a dry weight basis of the total pigment.

8. The coated substrate of claim 6 wherein the transparent metal oxide pigment has a particle size of about 20 nm to about 30 nm.

9. The coating composition of claim 6 wherein the metallic pigment comprises metal flake.

10. The coating composition of claim 6 wherein the metallic-like pigment comprises metal oxide coated mica.

11. An exterior, automotive multicoat coatnig composition comprising at least one layer of a pigmented base coat and at least one layer of an outer clear topcoat wherein the pigmented base coat comprises
    about 24.0 wt. % to about 35.0 wt. % of a thermoplastic or thermosetting resin;
    about 1:1 wt. % to about 10.5 wt. % of a transparent titanium dioxide pigment having a particle size of about 10 nm to about 45 nm and,
    about 1.1 wt. % to about 10.5 wt. % of a metallic or metallic-like pigment,
    the coating composition when applied to a substance and cured or dried having high chromaticity with deep downflop, and, opalescence.

12. The multicoat coating composition of claim 11 additionally comprising up to about 70.0 wt. % of at least one color pigment on a dry weight basis of the total pigment.

13. The multicoat coating composition of claim 11 wherein the transparent metal oxide pigment has a particle size of about 20 nm to about 30 nm.

14. The multicoat coating composition of claim 11 wherein the metallic pigment comprises metal flakes.

15. The multicoat coating composition of claim 11 wherein the metallic-like pigment comprises coated mica.

16. A method of coating a substrate applying at least one layer of an exterior, automotive coating composition to the substrate and then curing or drying the coating, wherein the coating composition comprises
    about 24.0 wt. % to about 35 wt. % of a thermoplastic or thermosetting resin;
    about 1.1 wt. % to about 10.5 wt. % of a transparent titanium dioxide pigment having a particle size of about 10 nm to about 45 nm and,
    about 1.1 wt. % to about 10.5 wt. % of a metal flake pigment,
    the coating thereby produced having high chromaticity with excellent downflop and opalescence.

17. The method of claim 15 where in the coating additionally comprises up to about 70.0 wt. % of at least one color pigment on a dry weight basis of the total pigment.

18. The method of claim 16 wherein the transparent metal oxide pigment has a particle size of about 20 nm to about 30 nm.

19. The method of claim 15 wherein the metallic pigment comprises metal flake.

20. The method of claim 15 wherein the metallic-like pigment comprises metal oxide coated mica.

21. A resinous exterior, automotive coating composition comprising
    about 1.1 wt. % to about 10.5 wt. % of transparent titanium dioxide pigment having a particle size of about 10 nm to about 45 nm and,
    about 1.1 wt. % to about 10.5 wt. % of a metallic or metallic-like pigment,
    the composition when applied to a substrate having high chromaticity with excellent downflop and opalescence.

22. The resinous coating composition of claim 21 wherein the transparent metal oxide pigment has a particle size of about 20 nm to about 30 nm.

* * * * *